United States Patent
Gieseke et al.

(10) Patent No.: US 10,579,293 B2
(45) Date of Patent: Mar. 3, 2020

(54) SYSTEM AND COMPUTER-IMPLEMENTED METHOD FOR IMPROVING DATA STORAGE AND ANALYSIS

(71) Applicant: ACI Worldwide Corp., Elkhorn, NE (US)

(72) Inventors: Eric James Gieseke, Lincoln, MA (US); Kenneth John Chenis, Lunenburg, MA (US)

(73) Assignee: ACI Worldwide Corp., Elkhorn, NE (US)

(*) Notice: Subject to any disclaimer, the term of this patent is extended or adjusted under 35 U.S.C. 154(b) by 174 days.

(21) Appl. No.: 15/717,400

(22) Filed: Sep. 27, 2017

(65) Prior Publication Data

US 2019/0095121 A1 Mar. 28, 2019

(51) Int. Cl.
*G06F 3/06* (2006.01)

(52) U.S. Cl.
CPC .......... *G06F 3/0644* (2013.01); *G06F 3/0604* (2013.01); *G06F 3/0656* (2013.01); *G06F 3/0673* (2013.01)

(58) Field of Classification Search
CPC ..... G06F 3/0604; G06F 3/0656; G06F 3/0673
See application file for complete search history.

(56) References Cited

U.S. PATENT DOCUMENTS

| | | | |
|---|---|---|---|
| 2001/0055303 A1* | 12/2001 | Horton | H04J 3/1682 370/389 |
| 2004/0111540 A1 | 6/2004 | Narad | |
| 2009/0049359 A1 | 2/2009 | Malladi et al. | |
| 2010/0312985 A1 | 12/2010 | Rostedt | |
| 2012/0136586 A1 | 5/2012 | Spreadbury et al. | |

FOREIGN PATENT DOCUMENTS

EP 2290562 A1 3/2011

OTHER PUBLICATIONS

International Search Report and Written Opinion for PCT/US2017/057020; International Filing Date Oct. 17, 2017; and all references cited therein.

* cited by examiner

*Primary Examiner* — Edward J Dudek, Jr.
(74) *Attorney, Agent, or Firm* — Hovey Williams LLP

(57) ABSTRACT

A system and computer-implemented method for storing data and for calculating data characteristics. A concentric ring buffer has a succession of representative ring buffers, each divided into segments and reflecting an increasingly long unit of a base (e.g., a time, count, or geo base) and with a decreasing level of precision. The concentric ring buffer has a fixed total memory size based on the number of ring buffers and segments. Each segment of each ring buffer is populated in a first-in-first-out manner with a value calculated for the data characteristic for a particular length of base unit and with a particular precision. When a ring buffer is full and another value is calculated, the oldest value is transferred to a next ring buffer or deleted if there is none. Further, values can be collected from multiple concentric ring buffers and consolidated in a single concentric ring buffer.

11 Claims, 6 Drawing Sheets

SYSTEM AND COMPUTER-IMPLEMENTED METHOD FOR IMPROVING DATA STORAGE AND ANALYSIS

FIELD

The present invention relates to systems and methods for storing data and for determining data characteristics, and more particularly, embodiments concern a system and computer-implemented method for improving the functioning of a computer with a concentric ring buffer for storing representations of data and for calculating data characteristics on any historic time or count base while limiting the amount of memory required for each data characteristic regardless of the size or location of the informing data set.

BACKGROUND

Many data analytic problems, such as fraud detection, sometimes require a large collection base to determine relevant data characteristics, or "features," of interest. These features can be used for calculating ancillary information about the data, or they can be used for various decision-making processes. Traditionally, to address this type of analysis, systems are forced to use a combination of pre-calculated features from older large sets of collection data and newer smaller sets of collection data to calculate current features. The systems then utilize the combination of these features to perform whatever type of data analysis is required. However, there is a trade-off between performance and precision, or granularity, in these systems because more data must be used to calculate the features with higher precision, but using more data results in greater overhead and slower performance. As a result, analysts are forced to choose one or more subsets of the data in order to balance the precision requirements with the performance requirements, and sometimes duplicate features so that different levels of precisions can be used for different use cases.

The performance challenge can be mitigated by housing all historic data in memory so that features can be calculated on any historic time or count base with perfect precision, but this poses two major problems. One problem is that the data set continuously grows without bound, and the cost of creating a system with enough memory to hold the data can exceed the financial value of the features calculated. The other problem is that the approach of having all of the data required to calculate features inhibits the easy distribution of workloads without the distribution of the data and prevents combining feature results from multiple data sets/sources.

This background discussion is intended to provide information related to the present invention which is not necessarily prior art.

SUMMARY

Embodiments of the present invention solve the above-described and other problems and limitations by providing a system and computer-implemented method for improving the functioning of a computer with a concentric ring buffer for storing representations of data and for calculating data characteristics on any historic time or count base while limiting the amount of memory required for each data characteristic regardless of the size or location of the informing data set.

In a first embodiment of the present invention, a system may be provided for improving the storing of data and for calculating data characteristics on a particular base. The system may broadly comprise an electronic memory element and an electronic processing element. The memory element may be configured to contain a succession of representative ring buffers, with each succeeding ring buffer being divided into segments and reflecting an increasingly long unit of the particular base and with a decreasing level of precision. The succession of ring buffers may have a fixed total memory size based on the number of ring buffers and the number of segments in each ring buffer. The processing element may be configured to, beginning with a base ring buffer in the succession of ring buffers, populate each segment of a particular ring buffer in a first-in-first-out manner with a value calculated for the data characteristic from the set of data for a particular length of unit of the particular base and with a particular precision. When the segments of the particular ring buffer are fully populated and another value is calculated for the data characteristic, an oldest value for the data characteristic may be transferred to a next ring buffer in the succession of ring buffers which has a next longest unit of the particular base and the next lowest level of precision, except that if there is no next ring buffer, then the oldest value is deleted. Any value calculated for the data characteristic from any segment of any ring buffer in the succession of ring buffers may be accessed and communicated at the request of a user.

In a second embodiment of the present invention, a computer-implemented method may be provided for improving the storing of data and for calculating data characteristics on a particular base. The computer-implemented method may broadly comprise the following steps. An electronic memory element may be configured to contain a succession of representative ring buffers, with each succeeding ring buffer being divided into segments and reflecting an increasingly long unit of the particular base and with a decreasing level of precision. The succession of ring buffers may have a fixed total memory size based on the number of ring buffers and the number of segments in each ring buffer. Beginning with a base ring buffer in the succession of ring buffers, an electronic processing element may populate each segment of a particular ring buffer in a first-in-first-out manner with a value calculated for the data characteristic from the set of data for a particular length of unit of the particular base and with a particular precision. When the segments of the particular ring buffer are fully populated and another value is calculated for the data characteristic, the processing element may transfer an oldest value for the data characteristic to a next ring buffer in the succession of ring buffers which has a next longest unit of the particular base and the next lowest level of precision, except that if there is no next ring buffer, then the oldest value is deleted. The processing element may access and communicated any value calculated for the data characteristic from any segment of any ring buffer in the succession of ring buffers at the request of a user.

Various implementations of the foregoing embodiments may include any one or more of the following additional features. The particular base may be a time base, a count base, or a geo base. A nature of the particular base may at least partly determine a nature of the particular length and a nature of the particular precision for the data characteristic for each ring buffer. Each value of the data characteristic for each ring buffer may be calculated using a mathematical formula and at least one variable.

A plurality of additional memory elements and processing elements may be provided, with each being associated with an additional succession of ring buffers which is identically configured to the succession of ring buffers but which stores a different value calculated for the data characteristic from a different set of data. A consolidated succession of ring buffers may also be provided which stores aggregate values calculated from the values from the succession of ring buffers and the different values from each additional of representative ring buffers. The aggregate values may be calculated without accessing the set of data associated with the succession of ring buffers or the different set of data associated with each additional succession of ring buffers.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Broadly characterized, the present invention provides a system and method for storing representations of data and for calculating data characteristics. More particularly, embodiments concern a system and computer-implemented method for improving the functioning of a computer with a concentric ring buffer for storing representations of data and for calculating data characteristics on any historic time or count base while limiting the amount of memory required for each data characteristic regardless of the size or location of the informing data set.

In one embodiment, the data may be stored in the construct of a formula with attributes such that precision is flexible for a given historic time, count, geo or other base, and memory utilization is bounded regardless of the size of the informing data set. This advantageously provides a high performance, low memory solution to storing historic event information which is important for providing insights to collected data, and allows for using technology that previously was not cost effective. Thus, the present technology allows for building analytic systems having extremely high performance while maintaining both precision and cost effectiveness.

Figure 1:
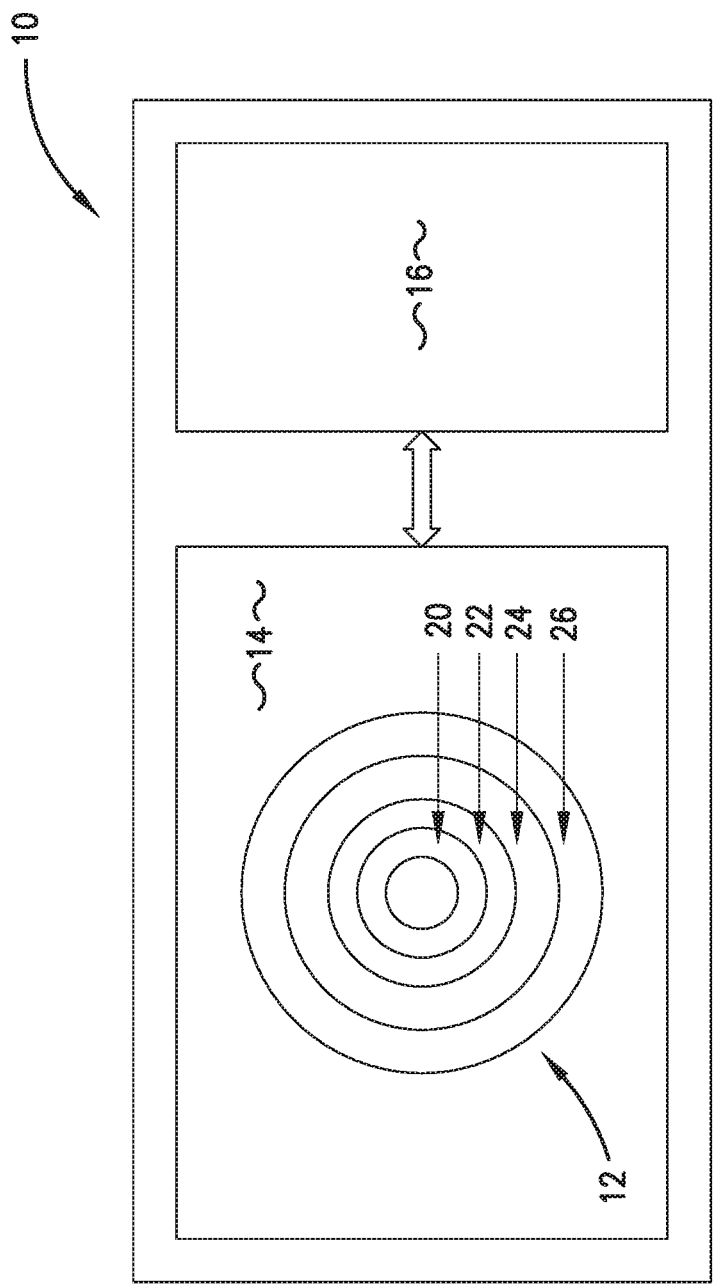
FIG. 1 is a high-level block diagram of an embodiment of a system for improving the storing of data and for calculating data characteristics on a particular base.

Referring to FIG. 1, an embodiment of a system 10 for implementing a concentric ring buffer 12 for storing representations, or summaries, of data and for calculating data characteristics is shown broadly comprising an electronic memory element 14 and an electronic processing element 16. The memory element 14 and the processing element 16 may be substantially any suitable technologies configured to implement the concentric ring buffer 12 and the various aspects thereof as described herein.

Figure 2:
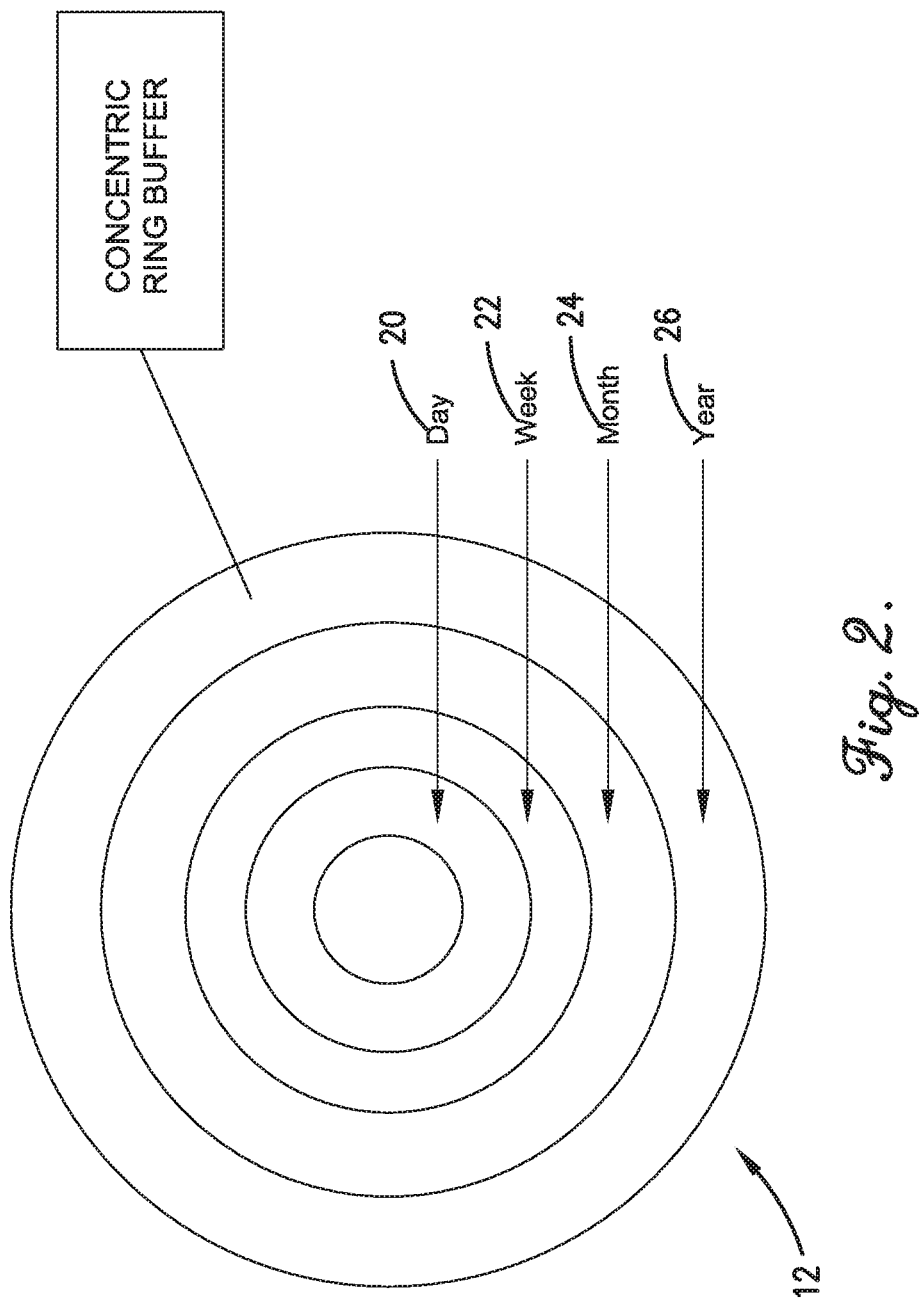
FIG. 2 is a depiction of a concentric ring buffer component of the system of FIG. 1.
Figure 3:
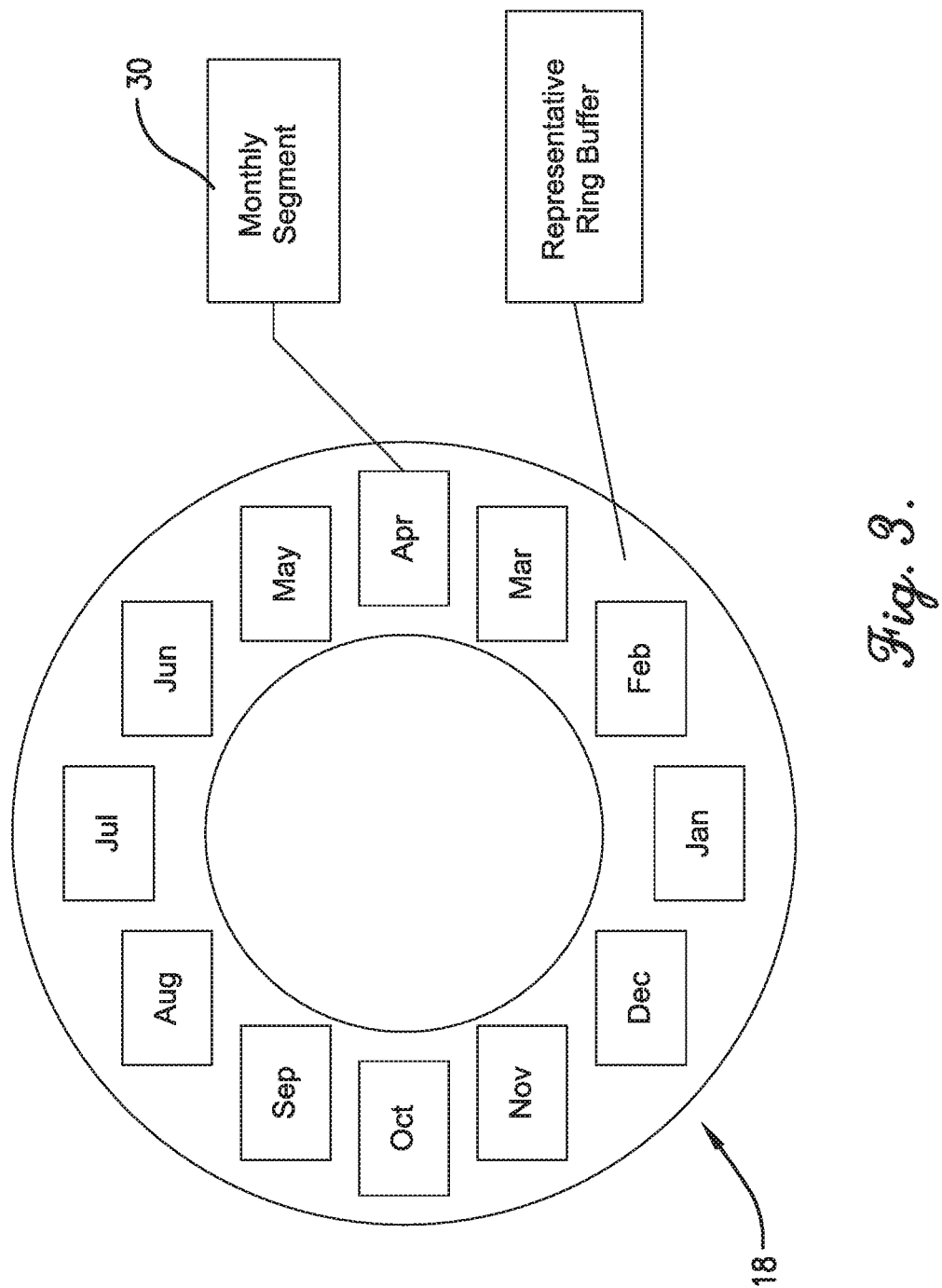
FIG. 3 is a depiction of a representative ring buffer component of the concentric ring buffer of FIG. 2.
Figure 4:
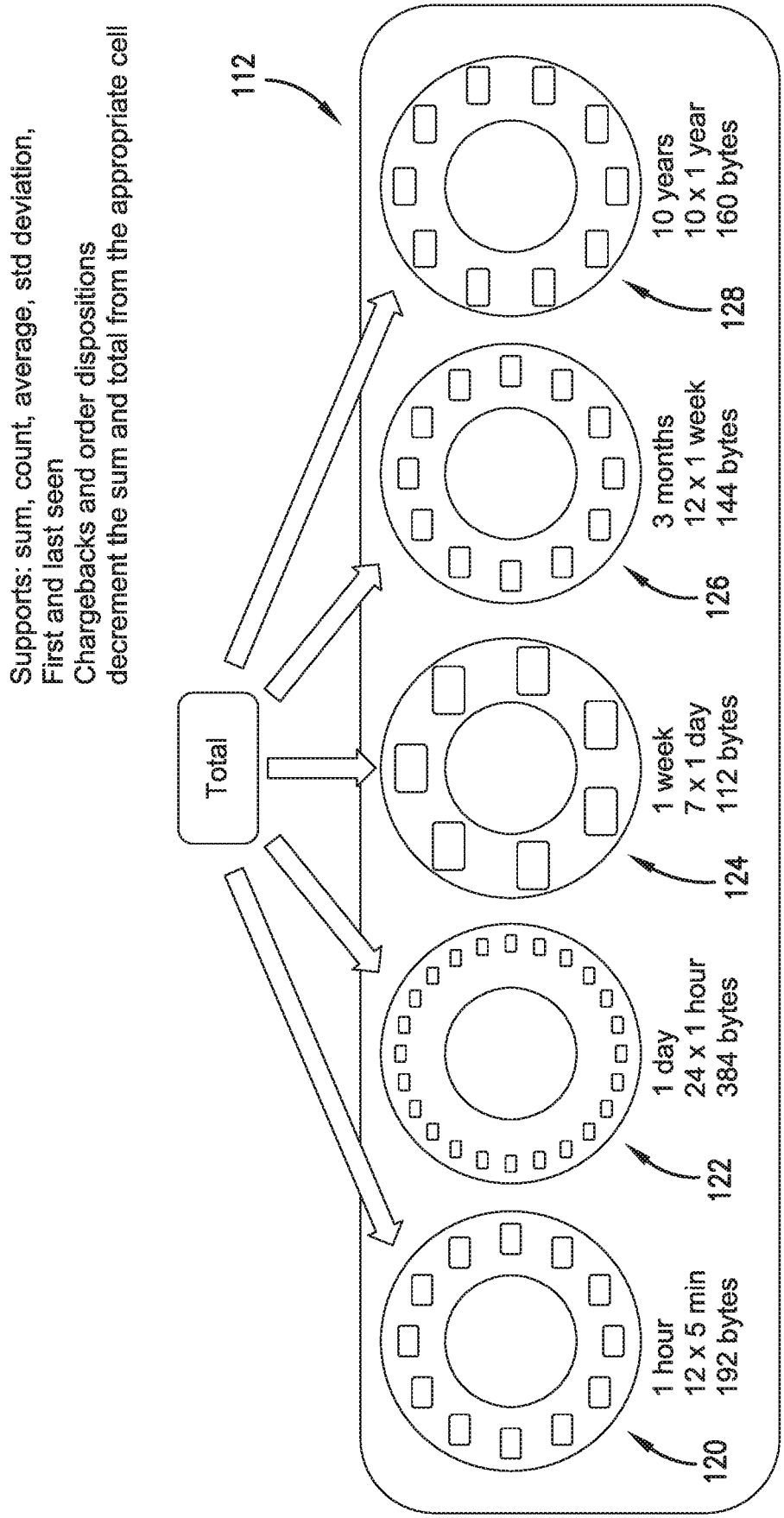
FIG. 4 is a depiction of an exemplary concentric ring buffer having five representative ring buffers.

Referring also to FIGS. 2-4, the concentric ring buffer 12 for storing representations of data may broadly comprise a succession of individual representative ring buffers 18 including a base ring buffer 20 and one or more additional ring buffers 22,24,26,28 arranged concentrically, or coaxially, about the base ring buffer 20. It will be understood by one with ordinary skill in the art that the ring buffers are neither physical rings nor physically concentric, but rather are commonly referred to as such (or as circular buffers, or cyclic buffers) because of their functional and relational properties, rather than their physical properties, and in fact, may be implemented and/or characterized as linear buffers. Functionally, each ring buffer 18 behaves as a fixed-size, first-in-first-out queue. Once the queue is initially fully populated, space is created for the newest data to enter the buffer by transferring or deleting the oldest data. Relationally, each ring buffer 18 in the concentric ring buffer 12 may be dedicated to a different period of time, count, or other unit of a base. For example, if time is the base, then moving outwardly from the innermost base ring buffer 20, each successive additional ring buffer 22,24,26,28 may be dedicated to a longer period of time. For example, as shown in FIG. 4, an exemplary concentric ring buffer 112 may have an hour ring buffer 120, a day ring buffer 122, a week ring buffer 124, a three month ring buffer 126, and a ten year ring buffer 128.

In more detail, each ring buffer 18 may store representations of data generated by formulas and variable values for a time, count, or other base. Each ring buffer 18 may be divided into segments 30, and each segment 30 may store the representation of data generated by the formula for the feature being calculated. The feature in the segment 30 is calculated from all of the data events that align with the time, count, or other base defined by the segment 30 and represented by the formula and the variable values.

For example, given twelve hundred financial transaction events evenly distributed over a period of a year, the monthly average transaction amount could be calculated by performing twelve formula calculations across a set of one hundred records for each calculation. However, with a representative ring buffer, the ring may be divided into twelve monthly segments, and rather than storing all one hundred records of data in each segment, only the feature-specific formula representing the data may be stored, which, in this case, is the average amount and the number of transactions used to calculate it. For this example, the formula could be: NewCurrentAverage= ((CurrentAvg*Count)+CurrentValue)/(Count+1). With this formula and two stored values, the segment can be kept up to date with an accurate representation of the feature (the average value, in this example). This representation of data utilizes far less memory than storing all of the events yet still preserves the precision of the feature for the segment's time, count, or other base. As information about new transactions is received, the most current segment's feature is recalculated and/or updated, but the storage size remains constant.

The formula used to calculate and/or represent the feature is unlimited in scope, and can include any mechanism necessary to calculate the feature for the given segment. More complicated features may require more complicated formulas, but the vast majority of features to be calculated may be represented with a formula that requires storing only a fraction of the data required to actually calculate the feature. Thus, each ring buffer 18 greatly reduces the amount of memory required to represent a feature over a period of time, samples, or other base with a particular precision (e.g., daily, weekly, monthly, yearly)).

When large time bases are used in analytic feature calculations, it is common to require high precision for recent events, but less precision for older events. For example, it may be desirable to know the average transaction amount in the previous three days to see a trend, but looking back over a period of ten years, it may be desirable to only know the yearly average transaction amount to establish a yearly trend. In the concentric ring buffer 12, the base ring buffer 20 has the highest level of precision, and each additional ring buffer 22,24,26 has a lower level of precision until, ultimately, the entire time, count, or other base for the data set is encompassed by the succession of ring buffers 18. When a particular ring buffer with a particular level of precision is full, the representation data of the oldest segment overflows as a single element into the newest segment of the next ring buffer with the next level of precision. In the next ring, it augments the newest segment, but with a larger time, count, or other base unit interval.

For example, building on the monthly buffer example above, the next ring buffer may contain yearly representations for the past ten years. If a precision of one year is chosen, this ring buffer would have ten segments, and each segment would be a representation of the twelve monthly segment representations that were transferred to it from the prior ring buffer. After twelve months, one yearly segment would be full and the next segment would begin to populate. After ten years, all ten segments would be populated and the oldest would either age-out and drop off or be incorporated into the next ring buffer, as desired.

The concentric ring buffer 12 may be count based, fixed time based, or window time based. As such, the aging-out of one segment to the next may be controlled by the configuration, and does not limit the present technology to rigid time- or count-based feature calculations. Each ring buffer 18 may be configured for the total time duration or count and the number of segments, which yields that ring's level of precision, or granularity. Segments may be rolling time windows reflecting relative time base, or may be tied to real time windows reflecting actual time. It will be understood by those with ordinary skill in the art that time and count are just two common examples of a base, and the present technology is flexible to allow for substantially any desired base.

A typical use case may be to use very high precision for the immediate term events, such as 10 ms time representations, and to have those expire to a second ring buffer at one second intervals, which expire to a third ring buffer at one minute intervals, a fourth ring buffer at one hour intervals, a fifth ring buffer at one day intervals, and so on. With this structure, a feature value over the past few seconds can be quickly retrieved with high precision, and there is still the flexibility to retrieve that same feature as it was three minutes ago, two hours ago, ten days ago, or even three years ago. Regardless of from where in the concentric ring buffer 12 the representative sample is retrieved, the precision of the time or count base for which the feature is retrieved is not lost. In more outwardly ring buffers, the representation data becomes sparser, and by the tenth or eleventh ring buffers, representation data may be provided for an entire millennium. However, the total memory utilized by the concentric ring buffer 12 only increases when another ring buffer is added, so once the feature is identified and the concentric ring buffer 12 is configured, the memory utilization can be calculated as a constant (assuming a fully populated buffer), and does not grow with time.

In another example, the calculated feature of interest may be the standard deviation of the average amount spent per week over a two year period. Normally, this would be calculated by saving all of the transactions for the two year period, calculating the average week-by-week values to determine the standard deviation, and providing those values in the form of a set or array. A fraud scoring engine/model or rule may use this information to note that the value of this transaction is greater than the peak standard deviation, the value is greater than two times the current week's standard deviation, the standard deviation has increased less than ten percent over the past year, and the standard deviation for the current week has been increasing more than five percent per day, then based on this, determine that this transaction may be fraudulent. Making this determination in this manner requires the entire set of values for the two year period.

However, using the concentric ring buffer approach of the present technology, the two year period may be divided into cells, and the period values may be pre-calculated based on the criteria of how they will be used. So in this example, for the current week more details about the daily standard deviation are needed, but for the previous period only the weekly values are needed, and lastly, the standard deviation of the entire previous year is needed. This could be done with three rings. The first ring could be divided into seven cells that account for the daily values. The second ring would be divided into fifty-two cells, and each of those cells would contain the representation values from the previous seven days (which constitute the weekly value). The third ring could be divided into two cells to account for the yearly periods, wherein the previous fifty-two weeks are represented in the yearly cell. If one thousand transactions make up this data set, the concentric ring buffer approach requires only (7+52+2) cells, or sixty-one data elements, which is an approximately ninety percent reduction in storage space over the prior art technique. If ten thousand transactions make up this data set, the concentric ring approach would still require only sixty-one data elements, which is an approximately ninety-nine percent reduction in storage space. As long as the representation information can be modeled as a formula or function, the cell can retain accuracy for the period examined.

Figure 5:
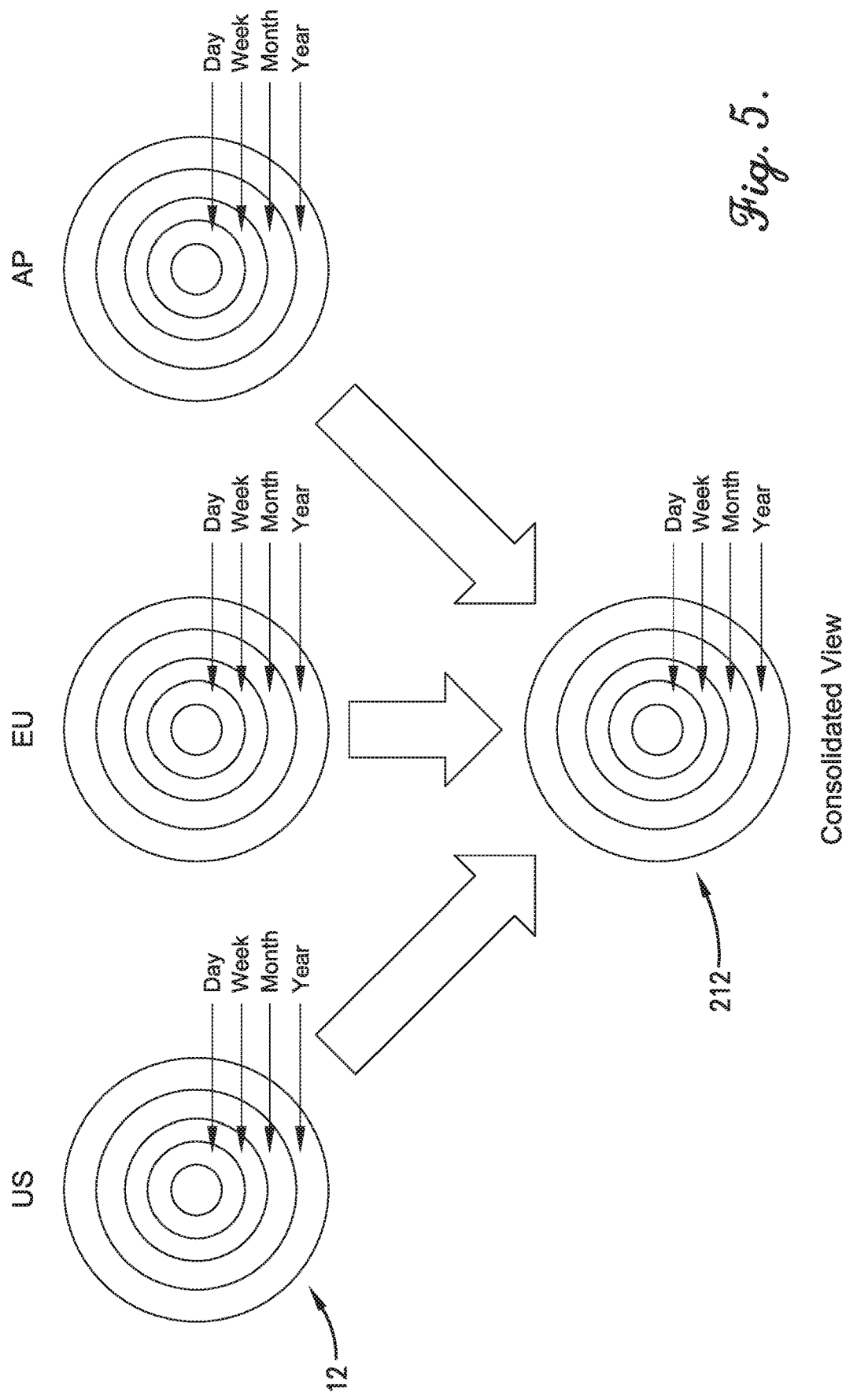
FIG. 5 is a depiction of multiple geo-distributed concentric ring buffers and one consolidated concentric ring buffer.

Referring to FIG. 5, the present technology further provides an extremely efficient way to share feature collection results across multiple systems, in which the representation data from multiple distributed concentric ring buffers 12 may be consolidated in a single consolidated concentric ring buffer 212. This enables multiple systems to participate in collective buffer calculations without having access to each other's data. This has benefits for workload distribution, but also enables geo-distributed clusters to participate in collective feature calculation sharing without needing to transfer large quantities of data. Because of the formula-based representation of each segment of a ring buffer, ring buffers that are configured the same way but built from independent data sets can be combined into the single consolidated concentric ring buffer 212 representing the collective feature state. This is particularly convenient for processing feature sets across geo-distributed regions and then combining the results for aggregated features, or comparing and contrasting feature values across various bases to each other.

Figure 6:
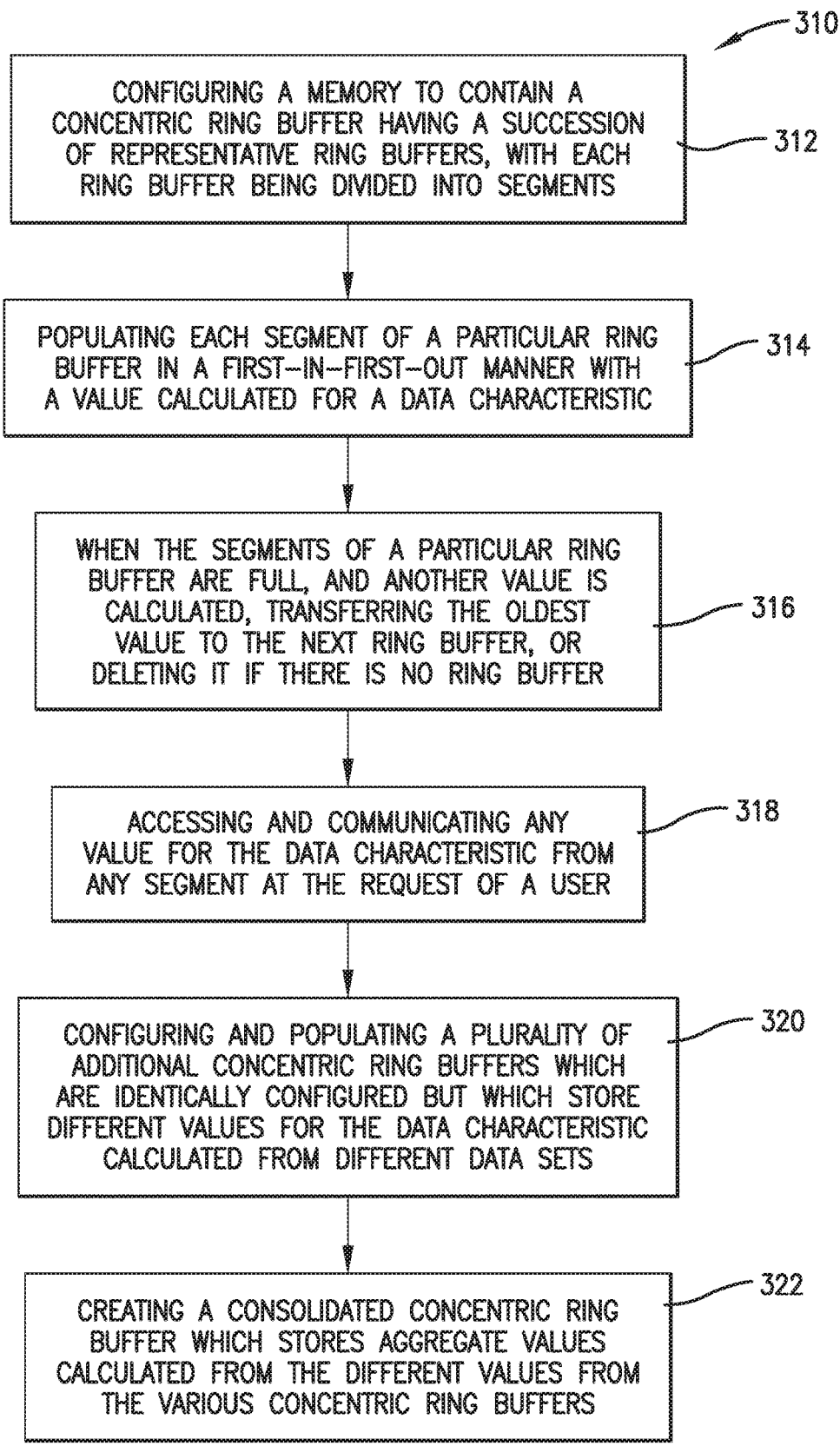
FIG. 6 is a high-level flowchart of steps in a computer-implemented method for improving the storing of data and for calculating data characteristics on a particular base.

Referring also to FIG. 6, an embodiment is shown of a computer-implemented method 310 for implementing a concentric ring buffer 12 for storing representations, or summaries, of data and for calculating data characteristics is shown broadly comprising an electronic memory. The computer-implemented method 310 may be a corollary to the functionality of the system 10 of FIG. 1, and may be similarly implemented using the various components of the system 10 within the above-described exemplary operating environment. The computer-implemented method 310 may broadly comprise the following steps.

An electronic memory element 14 may be configured to contain a concentric ring buffer 12 having a succession of representative ring buffers 18, with each succeeding representative ring buffer being divided into a plurality of segments 30 and reflecting an increasingly long unit of a particular base and with a decreasing level of precision, as shown in 312. The particular base may be, for example, a time base, a count base, and a geo base, and the nature of the particular base may at least partly determines a nature of the particular length and a nature of the particular precision for the data characteristic for each representative ring buffer. The concentric ring buffer 12 may have a fixed total memory size based on the number of representative ring buffers 18 and the number of segments 30 in each representative ring buffer.

An electronic processing element 16 may, beginning with a base representative ring buffer 20 in the succession of representative ring buffers 18, populate each segment of a particular representative ring buffer in a first-in-first-out manner with a value calculated for the data characteristic from the set of data for a particular length of unit of the particular base and with a particular precision, as shown in 314. Each value of the data characteristic may be calculated using a mathematical formula and at least one variable. When the plurality of segments of the particular representative ring buffer are fully populated and another value is calculated for the data characteristic, the electronic processing element 16 may transfer an oldest value for the data characteristic to a next representative ring buffer in the succession of representative ring buffers 18 which has a next longest unit of the particular base and the next lowest level of precision, except that if there is no next representative ring buffer, then the oldest value may be deleted, as shown in 316.

When requested do so by a user, the electronic processing element 16 may access and communicate any value calculated for the data characteristic from any segment of any representative ring buffer in the succession of representative ring buffers 18, as shown in 318.

The computer-implemented method may further include configuring in a plurality of additional electronic memory elements and populating with a plurality of additional electronic processing elements a plurality of additional successions of representative ring buffers which are identically configured to the succession of representative ring buffers but each of which stores a different value calculated for the data characteristic from a different set of data, as shown in 320. A consolidated succession of representative ring buffers may then be created which stores aggregate values calculated from the values from the succession of representative ring buffer and the different values from each additional succession of representative ring buffers, as shown in 322. The aggregate value may be calculated without accessing the set of data associated with the succession of representative ring buffers or the different set of data associated with each additional succession of representative ring buffers.

Thus, the system and computer-implemented method using the concentric ring buffer advantageously provides fixed and low memory utilization which allows for constructing high performance analytic systems for much less cost than a conventional in-memory event solution, enables efficient distributed feature calculation workloads, and still provides the same precision and performance capabilities as super-systems storing entire data sets.

Although described herein as involving multiple rings that are "concentric" in the sense that they store data that is qualitatively identical or at least similar, but quantitatively different in that each ring concerns the same data but with a different level of precision for the historic time, count, geo, or other base, other non-concentric embodiments may also be used.

An alternative embodiment may be a multi-dimensional representative ring buffer comprising multiple representative rings that are not concentric (in that the data in one ring may be qualitatively different from the data in another ring such that the rings differ in more than just the level of precision of the base), though all of the data may (or may not) still be relevant to a particular issue or otherwise related in some way. In all other ways, this non-concentric embodiment may be substantially similar or identical to the concentric embodiment. In particular, each cell of each ring may still involve storing representations of data generated by formulas and variable values, and still allow for calculating data characteristics on any base while limiting the amount of memory required for each data characteristic regardless of the size or location of the informing data set, and therefore still facilitate improved data storage and analysis.

Another alternative embodiment may be a single representative ring buffer. In all other ways, this non-concentric embodiment may be substantially similar or identical to the concentric embodiment. In particular, each cell may still involve storing representations of data generated by formulas and variable values, and still allow for calculating data characteristics on any base while limiting the amount of memory required for each data characteristic regardless of the size or location of the informing data set, and therefore still facilitate improved data storage and analysis.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be pro- tected by Letters Patent includes the following:

1. A system for improving the storing of data and for calculating data characteristics on a particular base from a set of data, the system comprising:
   an electronic memory element configured to contain—
      a succession of representative ring buffers, with each succeeding representative ring buffer being divided into a plurality of segments and reflecting an increasingly long unit of the particular base and with a decreasing level of precision,
      wherein the succession of representative ring buffers has a fixed total memory size based on the number of representative ring buffers and the number of segments in each representative ring buffer;
   an electronic processing element configured to—
      beginning with a base representative ring buffer in the succession of representative ring buffers, populate each segment of a particular representative ring buffer in a first-in-first-out manner with a value calculated for the data characteristic from the set of data for a particular length of unit of the particular base and with a particular precision,
      when the plurality of segments of the particular representative ring buffer are fully populated and another value is calculated for the data characteristic, transferring an oldest value for the data characteristic to a next representative ring buffer in the succession of representative ring buffers which has a next longest unit of the particular base and the next lowest level of precision, except that if there is no next representative ring buffer, then the oldest value is deleted, and
      accessing and communicating any value calculated for the data characteristic from any segment of any representative ring buffer in the succession of representative ring buffers at the request of a user;
   a plurality of additional electronic memory elements and electronic processing elements, with each additional electronic memory element and the electronic processing element being associated with an additional succession of representative ring buffers which is identically configured to the succession of representative ring buffers but which stores a different value calculated for the data characteristic from a different set of data; and
   a consolidated succession of representative ring buffers which stores aggregate values calculated from the values from the succession of representative ring buffer and the different values from each additional succession of representative ring buffers,
   wherein each aggregate value is calculated without accessing the set of data associated with the succession of representative ring buffers or the different set of data associated with each additional succession of representative ring buffers.

2. The system as set forth in claim 1, wherein the particular base is selected from the group consisting of a time base, a count base, and a geo base.

3. The system as set forth in claim 1, wherein a nature of the particular base at least partly determines a nature of the particular length and a nature of the particular precision for the data characteristic for each representative ring buffer.

4. The system as set forth in claim 1, wherein each value of the data characteristic for each representative ring buffer is calculated using a mathematical formula and at least one variable.

5. A system for improving the storing of data and for calculating data characteristics on a time base from a set of data, the system comprising:
   an electronic memory element configured to contain—
      a concentric ring buffer having a succession of representative ring buffers, with each succeeding representative ring buffer being divided into a plurality of segments and reflecting an increasingly long time period and with a decreasing level of precision,
      wherein the concentric ring buffer has a fixed total memory size based on the number of representative ring buffers and the number of segments in each representative ring buffer;
   an electronic processing element configured to—
      beginning with a base representative ring buffer in the succession of representative ring buffers, populate each segment of a particular representative ring buffer in a first-in-first-out manner with a value calculated for the data characteristic from the set of data for a particular time period and with a particular precision,
      when the plurality of segments of the particular representative ring buffer are fully populated and another value is calculated for the data characteristic, transferring an oldest value for the data characteristic to a next representative ring buffer in the succession of representative ring buffers which has a next longest time period and the next lowest level of precision, except that if there is no next representative ring buffer, then the oldest value is delete, and
      accessing and communicating any value calculated for the data characteristic from any segment of any representative ring buffer in the succession of representative ring buffers at the request of a user;
   a plurality of additional electronic memory elements and electronic processing elements, with each additional electronic memory element and the electronic processing element being associated with an additional concentric ring buffer having an additional succession of representative ring buffers which is identically configured to the succession of representative ring buffers but stores a different value calculated for the data characteristic from the different set of data; and
   a consolidated concentric ring buffer having a consolidated succession of representative ring buffers which stores aggregate values calculated from the values from the succession of representative ring buffer and the different values from each additional succession of representative ring buffers,
   wherein each aggregate value is calculated without accessing the set of data associated with the succession of representative ring buffers or the different set of data associated with each additional succession of representative ring buffers.

6. The system as set forth in claim 5, wherein the succession of representative ring buffers include—
   the base representative ring buffer reflecting hours and having twenty-four segments;
   a second representative ring buffer reflecting days and having seven segments;
   a third representative ring buffer reflecting weeks and having fifty-two segments; and
   a fourth representative ring buffer reflecting months and having twelve segments.

7. The system as set forth in claim 5, wherein each value of the data characteristic for each representative ring buffer is calculated using a mathematical formula and at least one variable.

8. A computer-implemented method for improving the functioning of a computer for improving the storing of data and for calculating data characteristics on a particular base, the computer-implemented method comprising:

configuring an electronic memory element to contain a succession of representative ring buffers, with each succeeding representative ring buffer being divided into a plurality of segments and reflecting an increasingly long unit of the particular base and with a decreasing level of precision, wherein the succession of representative ring buffers has a fixed total memory size based on the number of representative ring buffers and the number of segments in each representative ring buffer;

beginning with a base representative ring buffer in the succession of representative ring buffers, populating by an electronic processing element each segment of a particular representative ring buffer in a first-in-first-out manner with a value calculated for the data characteristic from the set of data for a particular length of unit of the particular base and with a particular precision;

when the plurality of segments of the particular representative ring buffer are fully populated and another value is calculated for the data characteristic, transferring by the electronic processing element an oldest value for the data characteristic to a next representative ring buffer in the succession of representative ring buffers which has a next longest unit of the particular base and the next lowest level of precision, except that if there is no next representative ring buffer, then the oldest value is deleted;

accessing and communicating by the electronic processing element any value calculated for the data characteristic from any segment of any representative ring buffer in the succession of representative ring buffers at the request of a user;

configuring in a plurality of additional electronic memory elements and populating with a plurality of additional electronic processing elements a plurality of additional successions of representative ring buffers which are identically configured to the succession of representative ring buffers but each of which stores a different value calculated for the data characteristic from a different set of data; and creating a consolidated succession of representative ring buffers which stores aggregate values calculated from the values from the succession of representative ring buffers and the different values from each additional succession of representative ring buffers, wherein each aggregate value is calculated without accessing the set of data associated with the succession of representative ring buffers or the different set of data associated with each additional succession of representative ring buffers.

9. The computer-implemented method as set forth in claim 8, wherein the particular base is selected from the group consisting of a time base, a count base, and a geo base.

10. The computer-implemented method as set forth in claim 8, wherein a nature of the particular base at least partly determines a nature of the particular length and a nature of the particular precision for the data characteristic for each representative ring buffer.

11. The computer-implemented method as set forth in claim 8, wherein each value of the data characteristic for each representative ring buffer is calculated using a mathematical formula and at least one variable.

\* \* \* \* \*